United States Patent Office.

CHARLES N. WAITE, OF CRANFORD, NEW JERSEY, ASSIGNOR TO CELLULOSE PRODUCTS COMPANY, OF WILMINGTON, DELAWARE, A CORPORATION OF DELAWARE.

PROCESS OF PREPARING VISCOSE.

SPECIFICATION forming part of Letters Patent No. 689,336, dated December 17, 1901.

Application filed April 26, 1901. Serial No. 57,590. (No specimens.)

*To all whom it may concern:*

Be it known that I, CHARLES N. WAITE, of Cranford, in the county of Union and State of New Jersey, have invented an Improvement in Processes of Preparing Viscose, of which the following is a specification.

My invention relates especially to the preparation of viscose by treatment of cellulose, cellulosic raw materials, and similar compounds with caustic alkali and carbon disulfid after the general manner set forth in United States Patent No. 520,770.

Viscose prepared in accordance with the above-mentioned specification is liable to spontaneous decomposition, as a result of which the cellulose which it contains splits off from the compound in an amorphous and hydrated condition. This decomposition, according to the conditions to which the compound is exposed, may occur within a few hours or at most within a few days of the preparation of the compound and seriously limits the usefulness and value of the viscose in case of many applications.

This invention has for its object the preparation of viscose after the general plan set forth in said Patent No. 520,770, but which will more slowly decompose, so that by reason of its prolonged life it is available or better adapted for use in case of many applications for which, as ordinarily prepared, it is unfitted.

I have discovered that the addition of ordinary spirits of turpentine, either to the alkali cellulose prior to its treatment with bisulfid of carbon or to the viscose resulting from the treatment with bisulfid or to the viscose solution in water, greatly prolongs the life of the compound.

In carrying out my invention I prefer to add one part, by weight, of spirits of turpentine for every part, by weight, of cellulose originally taken for the preparation of the viscose, and I prefer to add the turpentine directly to the alkali cellulose and immediately before its treatment with carbon disulfid.

In the practice of my invention it is not necessary to otherwise vary the general plan set forth in said Patent No. 520,770.

The viscose manufactured in accordance with this method will therefore contain spirits of turpentine, and as its life is greatly prolonged its introduction will not be restricted as is the viscose manufactured according to the general plan set forth in said Patent No. 520,770.

I claim—

1. The process herein described of preparing viscose, which consists in treating alkali cellulose with spirits of turpentine and disulfid of carbon.

2. The process herein described consisting in treating viscose with spirits of turpentine.

3. As a new article of manufacture, viscose containing turpentine.

In testimony whereof I have signed my name to this specification in the presence of two subscribing witnesses.

CHARLES N. WAITE.

Witnesses:
B. J. NOYES,
JOHN W. DECROW.